United States Patent [19]

Kornely, Jr. et al.

[11] Patent Number: 4,993,620

[45] Date of Patent: Feb. 19, 1991

[54] SOLDER-ELECTROFORMED JOINT FOR PARTICLE BEAM DRIFT TUBES

[75] Inventors: Michael G. Kornely, Jr., Centerport; Robert G. Micich, Bethpage; Douglas S. Holmes, Shirley, all of N.Y.

[73] Assignee: Grumman Aerospace Corporation, Bethpage, N.Y.

[21] Appl. No.: 518,441

[22] Filed: May 3, 1990

[51] Int. Cl.[5] .................... B23K 31/02; B23K 101/36

[52] U.S. Cl. .................................... 228/169; 228/175; 228/199; 228/214; 228/254; 29/607

[58] Field of Search ............... 228/165, 168, 169, 174, 228/175, 199, 214, 254, 263.13; 29/607

[56] References Cited

U.S. PATENT DOCUMENTS 4,355,236 10/1982 Holsinger .

4,643,347 2/1987 Bronnes et al. ................ 228/263.13

OTHER PUBLICATIONS

Y. Yamazaki et al., "The 1 GeV Proton Linac for the Japanese Hadron Facility", Gar Electroforming.

*Primary Examiner*—Sam Heinrich

*Attorney, Agent, or Firm*—Pollock, VandeSande & Priddy

[57] ABSTRACT

The face plates of a drift tube have their joints with a central cylindrical body sealed by utilizating two metallurgical techniques. The first technique involves the soldering of interface surfaces at the joints between the face plates and the body. The soldered joint prevents the entry of electroplating solution into the interior of the drift tube during a second metallurgical procedure involving the electroformation of a copper strap around the joint which provides a permanent seal against leakage of coolant from the drift tube while offering excellent electrical and thermal conductivity across the surface of the drift tube.

8 Claims, 1 Drawing Sheet

SOLDER-ELECTROFORMED JOINT FOR PARTICLE BEAM DRIFT TUBES

RELATED APPLICATIONS

This invention relates to the technology of co-pending U.S. Pat. application Ser. No. 07/522,825 filed May 14, 1990 and co-pending U.S. Pat. application Ser. No. 07/507,768 filed Apr. 12, 1990 both in the name of the same inventor and assigned to the same assignee.

FIELD OF THE INVENTION

The present invention relates to metallurgical bonding techniques, and more particularly to a method of soldering a joint together and then electroforming a strap over the joint.

BACKGROUND OF THE INVENTION

Linear accelerators, or Linacs, are devices which use radio frequency energy to accelerate charged particles such as electrons, protons, and ions. Charged particles from an ion source enter a cylindrical enclosure known as a tank which encloses coaxially spaced devices known as drift tubes. RF energy is present in the tank for accelerating the charged particles through the gaps between adjacent drift tubes. The construction of a linear accelerator is such that the particles become shielded within each drift tube from the effects of RF voltage reversals. Thus, as charged particles emerge from each drift tube and enter the next gap, they become further accelerated. It is necessary to provide means for focussing the charged particle beam along the axis of the tank so as to counteract its tendency to diverge. Different types of magnets are employed to do this and in co-pending U.S. Pat. applications Ser. No. 07/522,825 filed May 14, 1990, and U.S. Pat. application Ser. No. 07/507,768 filed Apr. 12, 1990, the utilization of quadrupole permanent magnets is discussed. These magnets are fabricated from rare earth cobalt segments.

A drift tube includes a central hollow cylindrical body having an annular permanent magnet assembly mounted therein. The interior of the drift tube is sealed by face plates which form transverse boundaries for gaps between adjacently positioned drift tubes. A manufacturing problem arises due to the thermal sensitivity of the permanent magnet assembly. Particularly, with rare earth cobalt permanent magnets, it is important to avoid exposure of the magnet assembly to temperatures over 100° C. Above this temperature the quadrupole magnetic properties become diminished.

With present drift tube assemblies attempts are usually made to perform electron beam welding of the face plates. However, this requires careful control due to the thermal sensitivity of the magnet assembly. Further, it is difficult to use electron beam welding since the electron beam becomes influenced by the strong magnetic field of the magnet assembly.

Japanese investigators at the National Laboratory for High Energy Physics in Japan and the Institute for Nuclear Study at the University of Tokyo have proposed the utilization of copper electroplating to seal the drift tube face plates. An electroplating procedure is extremely desirable due to the fact that the process is performed at room temperature. However, the attempt to electroplate a seal over the joint created between the face plates and the central body of the drift tube, as proposed by these investigators, is incomplete without thorough disclosure of preliminary joint seal steps which must be taken to ensure that no leakage of electroplating bath liquid (typically sulfuric acid) into the drift tube occurs. A preliminary joint seal must also create a continuous electrical and thermal interface, capable of remaining so after extreme thermal cycling. The creation of a gap in the joint would severely affect the cooling capability of the drift tube.

BRIEF DESCRIPTION OF THE PRESENT INVENTION

The present invention basically employs a two-step process for sealing the joint existing between the drift tube face plates and its central body. The first basic step is to pre-tin the joint interface surfaces of the face plates and the central body with a low melting temperature solder and then heat an assembled drift tube so that a soldering operation may be completed. The soldered interfaces create a sufficiently strong and impervious joint seal so that the drift tube may now undergo a succeeding step whereby copper is electrodeposited over the joint to form, in effect, an electroformed sealing strap of copper. The creation of a metallurgical bond between the solder and the drift tube interface surfaces prevents thermal gaps from developing, which might be the situation in the event that a wax or silver-filled lacquer seal was employed, as is the case with many electrodeposition techniques.

The solder employed in the present invention is a bismuth-based solder having a melting temperature below the critical 100° C. operating temperature necessary for preserving maximum quadrupole magnetization of the magnet assembly. The resulting soldered-electroformed joint provides structural continuity and radio frequency compatibility of the drift tube surface. Further, the present technique accomplishes the objectives without subjecting the magnet assembly to a heated environment which would adversely affect the magnet assembly. Thus, this eliminates the need for thermal control instrumentation during manufacture, as is the case when electron beam welding is used. Of course, this provides marked decreases in the cost and risks of manufacturing failure.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
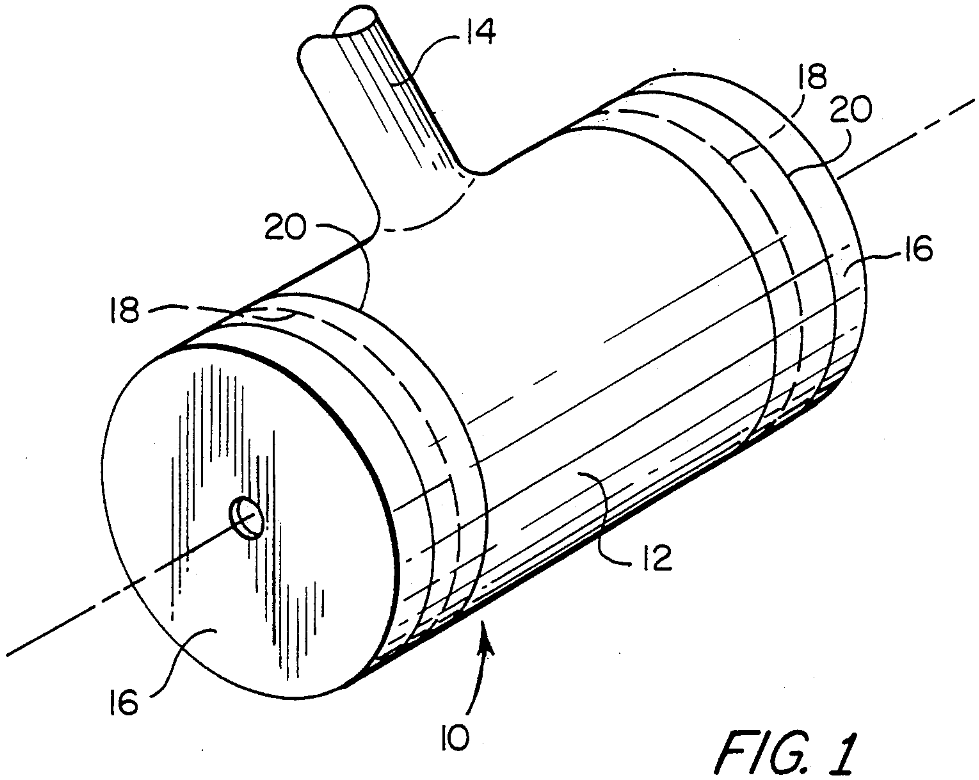
FIG. 1 is a perspective view of a drift tube fabricated in accordance with the present invention.

Reference numeral 10 generally denotes a drift tube as employed with linear accelerators and previously discussed in the Background of the Invention. A detailed description of the structure of such a drift tube is disclosed in the previously referred to related co-pending application, U.S. Ser. No. 07/507,768 filed Apr. 12, 1990. Basically, the drift tube includes a central hollow cylindrical body 12 which encloses a magnet for focusing the charged particle beam along the axis of the drift tube. The magnet and interior coolant passages are sealed by face plates 16. A stem 14 radially appends from the central body 12 and provides means for mounting the drift tube to the interior surface of a tank as well as providing conduit means for supplying coolant to the drift tube. The purpose of the present invention is to seal the joint or interface existing between each face plate 16 and an abutting transverse end of the drift tube central body 12. As previously discussed in the Brief Description of the Present Invention, the sealing is done by first creating a solder bond of the abutting surfaces at each interface or joint 18 which then permits an electroform strap 20 to be created about the joint, the electroform being in the nature of a strap encircling the joint between an face plate 16 and the central body 12.

Figure 2:
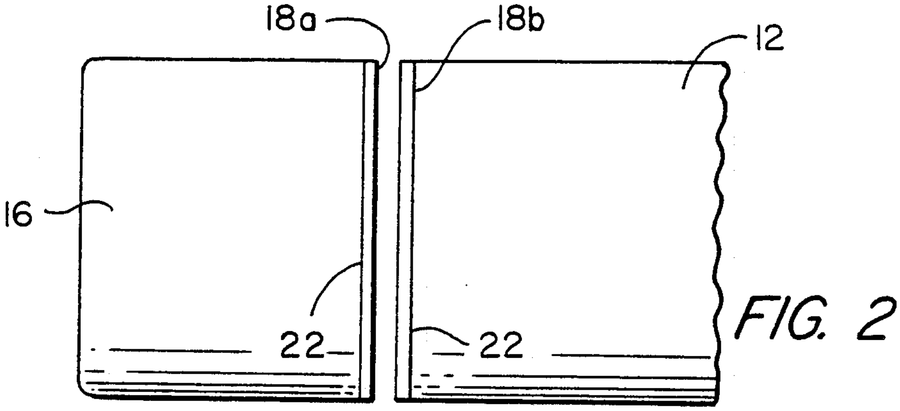
FIG. 2 is a cut-away view of the drift tube showing the confronting joint interface surfaces between the central body of the drift tube and a face plate, the surfaces being pre-tinned with low melting temperature solder.
Figure 3:
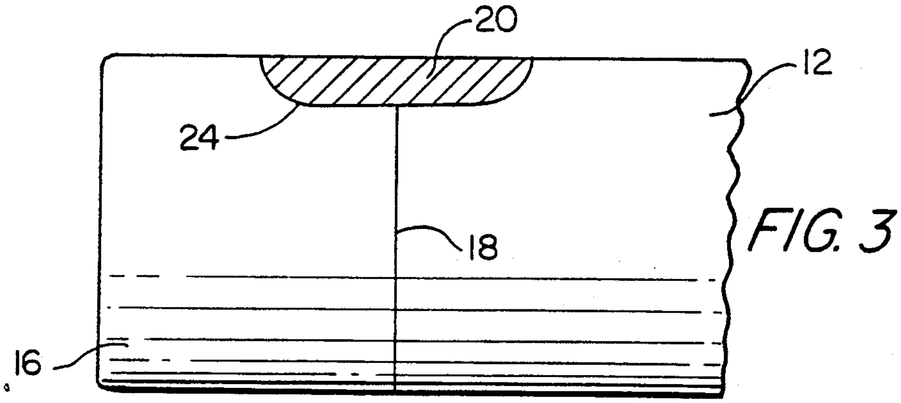
FIG. 3 is a cut-away view illustrating the left end of the drift tube as shown in FIG. 1 and particularly illustrating the solder-electroformed joint seal of the present invention.

Reference is made to FIG. 2 which illustrates the interface surfaces 22 prior to forming a sealed joint 18 with solder. The interface surfaces 22 are pre-tinned with a low melting temperature solder so as to form layers 18*a* and 18*b*. It may be necessary to heat the joining members before pre-tinning so that the interface surfaces 22 become outgassed. Since the magnet enclosed in the drift tube is a rare earth cobalt magnet assembly (not shown), it is imperative that soldering take place at temperatures below 100° C. so that the magnetic properties of the magnet assembly are not diminished. A suitable solder comprises indium in addition to bismuth and lead components. Such a solder is commercially available and is known as INDALLOY 136 which has a melting temperature significantly lower than the 100° C. limit. Soldering itself may be accomplished by maintaining the face plates 16 in abutment with the central body 12 and subjecting the pre-tinned interfaces 22 to an oxygen-free oven. After soldering has been accomplished, it is desirable to machine the extra solder extending outwardly from the joint 18. The previously discussed soldering technique will provide an adequate metallurgical bond with the copper of the drift tube and more importantly will form an impervious seal when the drift tube is lowered into an electroplating bath typically containing sulfuric acid. Clearly, such protection is necessary to protect the interior components of the drift tube from the sulfuric acid solution. Prior art seals including wax and silver-filled lacquers would be inadequate for utilization with the present invention since these drift tubes are normally cooled with cryogenic temperatures and such would cause thermal gaps to develop in the joint 18 thereby severely affecting the electrical and cooling efficiency of the drift tube.

The process of the present invention continues with the electrodeposition of a copper strap around each of the joints 18. It is necessary to add this strap in addition to the solder bonding inasmuch as the solder joint necessarily contains undesirable microporosity and does not offer a great deal of permanent strength.

In order to form the electroformed strap 20, a recess 24 is formed around each face plate 16, inwardly of interface surface 22 and over a corresponding peripheral area at both transverse ends of body 12, immediately inwardly from the transverse ends. The result is a continuous peripheral recess 24 formed over the joint 18. With the joint 18 sufficiently sealed against the sulfuric acid solution of an electroplating bath, the drift tube 10 with its machined recess 24, may be submerged in an electroplating bath until sufficient copper has been electrodeposited in the recess to be flush with the outer surface of the drift tube. The result will be a copper electroformed strap which metallurgically bonds to the drift tube components and permanently seals the joints 18 thereby preventing leakage of coolant out from a finally assembled drift tube as well as preventing entry of unwanted gas into the sealed interior of the drift tube.

It should be understood that the invention is not limited to the exact details of construction shown and described herein for obvious modifications will occur to persons skilled in the art.

We claim:

1. A method for sealing an interface existing between two abutting members comprising the steps:

machining a recess in each member, the recess extending outwardly of its interface surface;

positioning the members together wherein the recesses of the members mate to form a single continuous recess across the interface;

soldering the interface surfaces of the members with low melting temperature solder; and electrodepositing metal into the continuous recess thereby electroforming a strap around the interface which metallurgically bonds with both members to seal the interface.

2. The method set forth in claim 1 wherein the solder has a melting point below 100° C.

3. The method set forth in claim 1 wherein the electrodeposited metal is copper.

4. The method set forth in claim 1 wherein soldering includes the steps of:

pre-tinning the interface surfaces with the solder prior to positioning the members together;

heating the members while they are positioned together until the solder melts; and cooling the members thereby bonding the interface surfaces together.

5. The method set forth in claim 1 together with the step of machining the solder to remove excess solid solder extending outwardly from the interface.

6. A method for sealing a joint existing between the face plates and a main body of a drift tube, the steps comprising:

machining a recess in each face plate and corresponding drift tube end, each recess extending outwardly of the joint;

pre-tinning joint surfaces of the face plates and main body with a solder having a melting point less than 100° C.;

positioning the face plates against the drift tube main body wherein the recesses across each joint mate to form a continuous recess thereacross;

applying heat to the body and face plates for melting the solder;

removing applied heat for bonding the face plates to the main body;

electrodepositing metal into each continuous recess thereby electroforming a strap across each joint which metallurgically bonds with a respective face plate and drift tube end to seal a corresponding joint.

7. The method set forth in claim 6 together with the step of machining the soldered face plates to remove excess solid solder extending outwardly therefrom.

8. The method set forth in claim 7 wherein the solder is comprised of bismuth, indium, and lead components.

* * * * *